W. MÜLLER.
BUG TRAP.
APPLICATION FILED MAY 10, 1917.
1,261,842.
Patented Apr. 9, 1918.
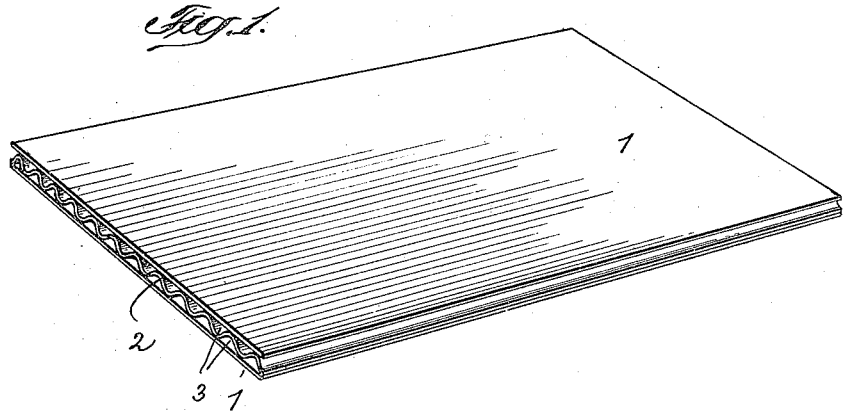
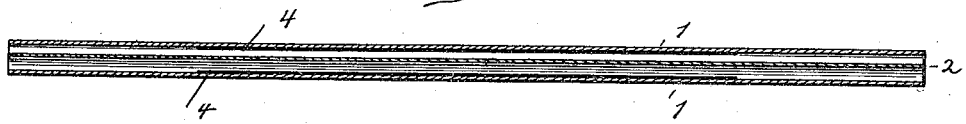
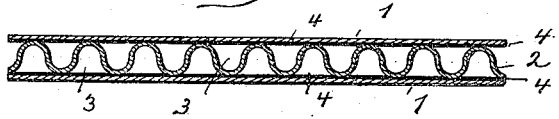
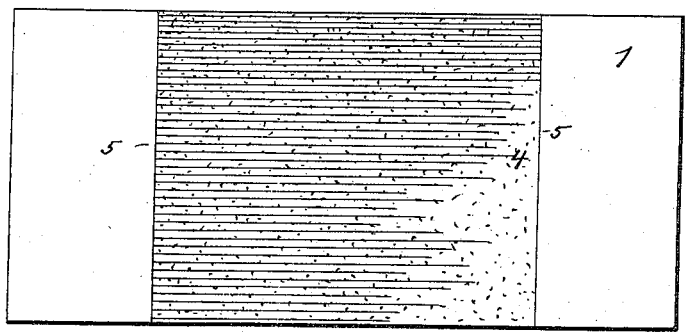
INVENTOR
Wilhelm Müller
BY
ATTORNEY

UNITED STATES PATENT OFFICE.

WILHELM MÜLLER, OF NEW YORK, N. Y., ASSIGNOR OF ONE-HALF TO CURT H. SENF, OF LEONIA, NEW JERSEY.

BUG-TRAP.

1,261,842.    Specification of Letters Patent.    Patented Apr. 9, 1918.

Application filed May 10, 1917. Serial No. 167,745.

*To all whom it may concern:*

Be it known that I, WILHELM MÜLLER, a citizen of Austria, and a resident of New York city, in the county and State of New York, have invented certain new and useful Improvements in Bug-Traps, of which the following is a specification.

This invention relates to a trap of novel construction for catching insects, the trap being more particularly intended for the extermination of bed bugs.

In the accompanying drawing:

Figure 1 is a perspective view of a bug trap embodying my invention;

Fig. 2, a longitudinal section thereof;

Fig. 3, a transverse section, and

Fig. 4, an inner view of one of the covering sheets.

The device comprises a pair of flat covering sheets 1 made of equal size and composed of paper, card board or similar cheap and combustible material. These sheets are spaced from each other, for the accommodation of a continuous corrugated sheet or core 2 which is made likewise of paper or similar material and is secured to the covering sheets by means of a suitable adhesive.

In this way, there will be formed, two parallel rows of continuous longitudinal channels 3 extending from end to end of the covering sheets, one of said rows being formed between the core and one of the covering sheets, while the other row is formed between said core and the other covering sheet. All of these channels are closed throughout their length but are open at their ends for the admission of the bugs.

The inner face of each sheet 1 is covered by a bait 4 designed to attract the insects, said bait consisting preferably of a mixture of say eight parts by weight of animal blood, two parts of lard and five parts of water. This bait constitutes a part coating for the channels, but is applied to the center portion of the trap only, say between the parallel lines 5—5 Fig. 4, so that the ends of the channels form approaches along which the insects must travel for some distance before reaching the bait, which thus lures them as far as possible into the trap. This bait will attract the bugs to such an extent that they will leave their usual haunts, spare the human inhabitants, and nest and breed in the trap, which will thus serve to effectively rid the house of the pests. Inasmuch as a row of channels is formed along each side of the core, the entire clearance between the covering sheets is utilized for trapping purposes.

The trap being flat may be placed behind mirrors, pictures, under the bed bottom and in other convenient places, and after having been charged, may be burnt up or otherwise destroyed. Of course, the bait may be applied to the corrugated core in lieu of being applied to the covering sheets, and may also be applied to the core and also the sheets.

I claim:

A bug trap comprising a pair of covering sheets, made of equal size, an interposed corrugated sheet secured to the inner faces of said covering sheets, said corrugated sheet being provided with a plurality of continuous channels extending from end to end of the covering sheets, and with a bait on the central portions of the covering sheets facing said channels, while the end portions of said sheets are devoid of bait.

WILHELM MÜLLER.

Copies of this patent may be obtained for five cents each, by addressing the "Commissioner of Patents, Washington, D. C."